United States Patent
Kainuma et al.

(10) Patent No.: US 7,196,512 B2
(45) Date of Patent: Mar. 27, 2007

(54) MAGNETIC HEAD TESTER

(75) Inventors: Norio Kainuma, Kawasaki (JP); Hidehiko Kira, Kawasaki (JP); Kenji Kobae, Kawasaki (JP); Hiroshi Kobayashi, Kawasaki (JP); Katsutoshi Hirasawa, Kawasaki (JP); Takatoyo Yamakami, Kawasaki (JP); Masumi Katayama, Kawasaki (JP); Shinji Hiraoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 10/722,823

(22) Filed: Nov. 26, 2003

(65) Prior Publication Data

US 2004/0104722 A1 Jun. 3, 2004

Related U.S. Application Data

(63) Continuation of application No. PCT/JP01/06560, filed on Jul. 30, 2001.

(51) Int. Cl.
*G01R 33/12* (2006.01)

(52) U.S. Cl. ............................ 324/210; 324/262
(58) Field of Classification Search ................ 324/210, 324/244, 238, 262, 212; 360/245.3, 255.1–255.9, 360/250; 369/244.2
See application file for complete search history.

(56) References Cited

U.S. PATENT DOCUMENTS

| | | | | |
|---|---|---|---|---|
| 4,902,971 A | * | 2/1990 | Guzik et al. ............... 324/212 |
| 5,166,847 A | * | 11/1992 | Zak ......................... 360/245.1 |
| 5,254,946 A | * | 10/1993 | Guzik ........................ 324/262 |
| 5,315,454 A | * | 5/1994 | Fukakusa ..................... 360/75 |
| 5,657,187 A | * | 8/1997 | Hatch et al. ............. 360/244.8 |
| 5,758,406 A | * | 6/1998 | Hunsaker et al. ........ 29/603.06 |
| 5,790,347 A | * | 8/1998 | Girard ....................... 360/245 |
| 6,094,047 A | * | 7/2000 | Guzik et al. ................ 324/262 |
| 6,212,045 B1 | * | 4/2001 | Guzik ..................... 360/255.2 |
| 6,317,295 B1 | * | 11/2001 | Nakagawa ............... 360/254.1 |
| 6,359,758 B1 | * | 3/2002 | Boutaghou .............. 360/294.4 |
| 6,856,469 B2 | * | 2/2005 | Yoneyama et al. ......... 359/696 |
| 6,965,500 B1 | * | 11/2005 | Hanna et al. ............... 360/245 |
| 2003/0002198 A1 | * | 1/2003 | Subrahamanyan et al. ....... 360/77.02 |
| 2004/0231139 A1 | * | 11/2004 | Jurgenson ................ 29/603.03 |
| 2005/0083050 A1 | * | 4/2005 | Tsukernik et al. .......... 324/262 |

FOREIGN PATENT DOCUMENTS

JP 63-136369 6/1988
JP 02-301011 12/1990

\* cited by examiner

*Primary Examiner*—Edward Lefkowitz
*Assistant Examiner*—Kenneth J. Whittington
(74) *Attorney, Agent, or Firm*—Greer, Burns & Crain, Ltd

(57) ABSTRACT

The magnetic head tester of the present invention drives a medium for rotation to float a slider from the medium so as to test a magnetic head for its characteristics, and the tester includes a holder removably holding the slider opposed to the surface of the medium, and suspension means provided in the holder which has the same function as a suspension supporting the slider in a real apparatus. With this tester, tests can be executed by exchanging the slider alone, and it is unnecessary to discard the suspension even when the magnetic head is judged to be defective, thus the loss of production costs for the suspension and processing costs for assembling the slider in the suspension can be avoided.

11 Claims, 4 Drawing Sheets

MAGNETIC HEAD TESTER

This is a continuation of International PCT Application No. PCT/JP01/06560 filed Jul. 30, 2001.

FIELD OF TECHNOLOGY

The present invention relates to a magnetic head tester for testing characteristics of a magnetic head to be assembled in a magnetic disk drive unit, more precisely relates to a magnetic head tester for testing floating characteristics, electromagnetic transduction characteristics of a magnetic head.

CONVENTIONAL TECHNOLOGY

A magnetic head of a magnetic disk drive unit, which is used for writing and reading data, is tested about characteristics of floating from a surface of a medium rotating and characteristics of electromagnetic transduction relating to reading data from and writing data on the medium, then the tested magnetic head is assembled in a real magnetic disk drive unit. Conventionally, as shown in FIG. 12, a magnetic head suspension assembly 18, in which a slider 10 is mounted on a suspension 12, is assembled so as to execute the tests. The magnetic head suspension assembly 18 is set in a tester, a medium or a magnetic disk is rotated so as to float a magnetic head, and a floating level and characteristics of reading and writing data are tested so as to check quality of the magnetic head.

FIG. 13 is a perspective view of the slider 10. Symbols 14 stand for float patterns forming on an air bearing surface of the slider 10, a symbol 15 stands for a data writing/reading element, and symbols 16 stand for connecting terminals. The magnetic head suspension assembly 18 is assembled by the steps of: connecting the slider 18 to a gimbal section of the suspension 12; and electrically connecting the terminals 16 to cable patterns formed in the suspension 12.

Recently, in a magnetic disk drive unit having a large capacity, a floating level of a magnetic head from a surface of a medium is dozens of nm, and the level is reduced with increasing the capacity of the medium. Therefore, a slight difference of the floating level of the magnetic head highly influences the characteristics of reading and writing data, so it is important to execute the tests with actually floating the magnetic head.

In the conventional magnetic head tester, as described above, the magnetic head suspension assembly is set in the tester. Therefore, if the magnetic head tested is judged to be a bad product according to the results of the tests, the whole magnetic head suspension assembly will be discarded. High quality magnetic heads are required with increasing capacity of media, thus higher technology for manufacturing high quality magnetic heads is required, but manufacturing yield is reduced. Magnetic head suspension assemblies are often discarded due to bad characteristics of sliders.

The function of the suspension of the magnetic head suspension assembly is made higher with increasing capacity of media, so the suspension has high additional value. Therefore, by discarding the whole magnetic head suspension assembly which has been judged to be a bad product by the tests, the costs of making the suspension and assembling the slider on the suspension come to nothing. Namely, it causes an economical problem.

In the conventional magnetic head tester in which the magnetic head suspension assembly is set, the characteristics of the product are influenced by variations of qualities of the suspension, e.g., elasticity, a roll angle and a pitch angle of a gimbal section supporting the slider, and factors of mounting the slider onto the suspension. Namely, if the characteristics of the product are varied by variation of the elasticity of the suspension, etc., prescribed electromagnetic transduction characteristics cannot be gained, so that the product is judged to be a bad product. In this case, an inspector cannot clearly know whether the magnetic head suspension assembly is judged as a bad product due to characteristics of the magnetic head or not.

Thus, the present invention was invented to solve the above described problems, and an object of the present invention is to provide a magnetic head tester capable of correctly judging characteristics of magnetic heads, executing the tests correctly, preventing loss of manufacturing and assembling parts, etc, which are caused by discarding good suspensions, and reducing manufacturing costs.

DISCLOSURE OF THE INVENTION

To achieve the object, the present invention has the following structures.

The magnetic head tester for testing characteristics of a magnetic head, in which a medium is rotated to float a slider from the medium, comprises: a holder removably holding the slider opposed to a surface of the medium; and suspension means being provided in the holder, which has the same function as a suspension supporting the slider in a real apparatus.

The magnetic head tester further comprises: a holder base inclinable holding the holder; and means for always biasing the holder toward the medium.

In the magnetic head tester, the holder is inclinably supported, with respect to the holder base, by a supporting pin, which supports a load center of the holder, and the biasing means is provided to the supporting pin.

The magnetic head tester further comprises an elastic member being provided between the holder and the holder base so as to limit inclination of the holder.

In the magnetic head tester, the elastic member is a coil spring, a cushion or a leaf spring of the holder, which suspends the holder.

In the magnetic head tester, a liquid is stored in the holder base, and the holder is floated on and supported by the liquid.

The magnetic head tester further comprises: a hemispheric base supporting the slider on a flat face; and a plurality of supporting pins being central-symmetrically arranged in the holder base, the supporting pins being biased toward the hemispheric base so as to slidably support a spherical face of the hemispheric base, wherein axial lines of the supporting pins are radially arranged with respect to a center of the hemispheric base.

Further, the magnetic head tester further comprises: a hemispheric base supporting the slider on a flat face, the hemispheric base being slidably supported by the holder base; and a plurality of air holes being central-symmetrically formed in the holder base and radially arranged with respect to a center of the hemispheric base, wherein air is jetted toward a spherical face of the hemispheric base form the air holes.

PREFERRED EMBODIMENTS OF THE INVENTION

Preferred embodiments of the present invention will now be described in detail with reference to the accompanying drawings.

Figure 1:
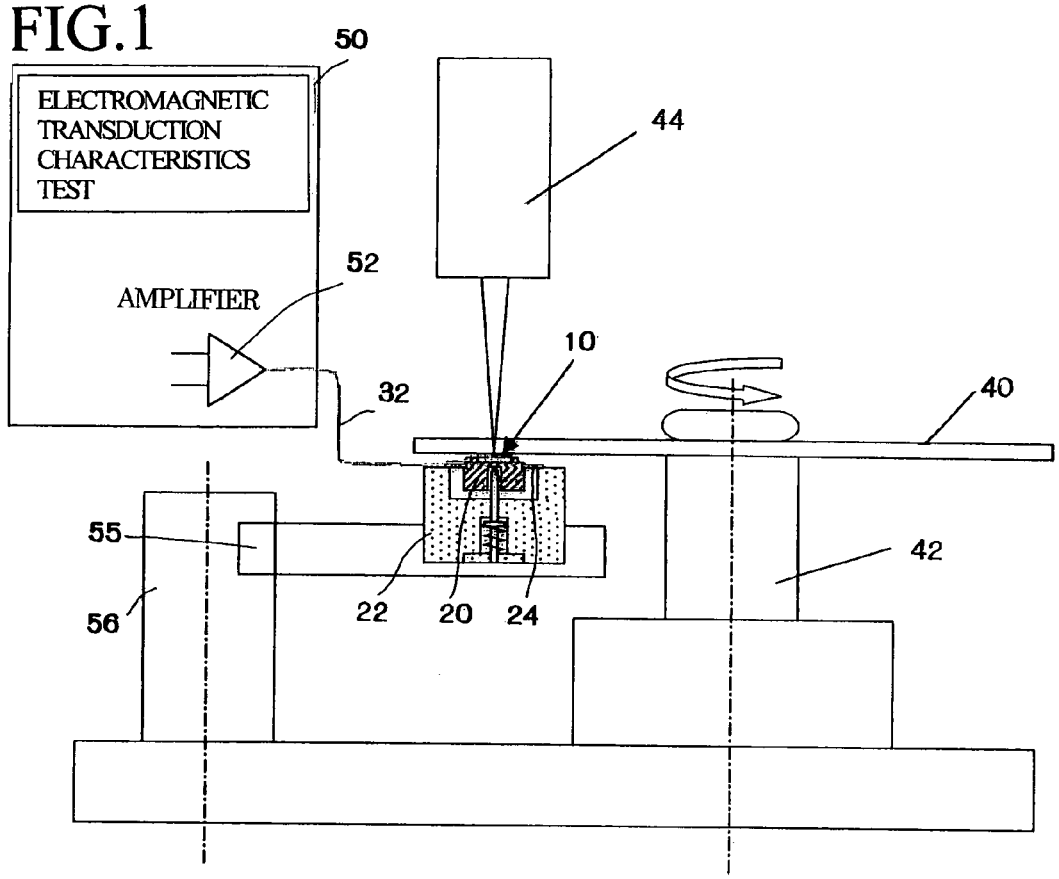
FIG. 1 is an explanation view showing a whole structure of a magnetic head tester.
Figure 2A:
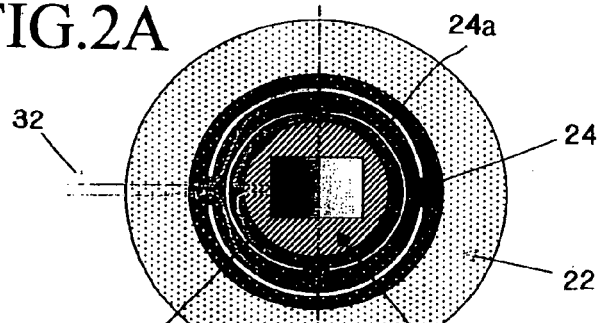
FIGS. 2A and 2B are a plane view and a sectional view of a holder.

FIG. 1 is an explanation view showing a whole structure of the magnetic head tester. In the drawing, a symbol 20 stands for a holder supporting a slider 10 to be tested, and a symbol 22 stands for a holder base supporting the holder 20. A structure for supporting the holder 20 is enlarged in FIG. 2. FIG. 2A is a plan view of the structure for supporting the holder 20, and FIG. 2B is a sectional view thereof.

The holder 20 is formed into a columnar shape and suspended in an accommodating hole 22a, which is formed in an upper part of the holder base 22 and whose planar shape is a circular shape, by a leaf spring 24, which is spanned between an outer edge of the holder 20 and an inner edge of the accommodating hole 22a. An inner diameter and a depth of the accommodating hole 22a are greater than an outer diameter and a height of the holder 20; enough spaces are formed between an outer circumferential face and a bottom face of the holder 20 and an inner circumferential face and an inner bottom face of the accommodating hole 22a. Sizes of the holder 20 and the accommodating hole 22a are designed to allow the holder to incline in the accommodating hole 22a in any direction.

Figure 2B:
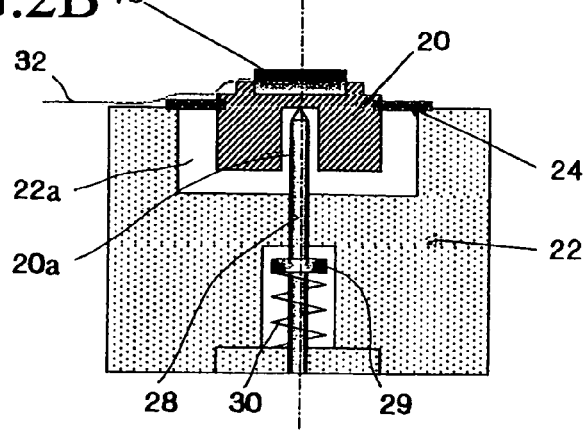

As shown in FIG. 2B, a loose hole 20a is formed in the bottom face of the holder 20 and extended in an axial direction of the holder 20. A symbol 28 stands for a supporting pin held by the holder base 22, and an upper part of the supporting pin 28 enters the loose hole 20a. An upper end of the supporting pin 28 is formed into a sharp conical shape, and the sharp end of the supporting pin 28 contacts an inner bottom face (a ceiling face) of the loose hole 20a. Since the upper end of the supporting pin 28 is a sharp end, the supporting pin 28 is capable of supporting the holder at a point and the holder 20 is capable of inclining in any direction. Further, enough space is formed between the outer circumferential face of the supporting pin 28 and the inner circumferential face of the loose hole 20a, so that the supporting pin 28, which is inserted in the loose hole 20a, does not interfere the inclination of the holder 20.

The supporting pin 28 is held by the holder base 22, capable of sliding in the axial direction, and always biased to lift the holder upward by a coil spring 30. A symbol 29 stands for a flange section of the supporting pin 28. Projection of the supporting pin 28 is limited by the flange section 28.

As shown in FIG. 2A, the leaf spring 24 is formed into a ring-shape, and it covers a space between the outer edge of the holder 20 and an inner edge of the accommodating hole 22a. Arc slits 24a are formed in the leaf spring 24 and central-symmetrically arranged with respect to a center of the holder 20. The leaf spring 24 originally has an elasticity, and its elasticity is adjusted by forming the arc slits 24a. Since the slits 24a are formed into arc shapes, the holder 20 can be inclined in any direction and the leaf spring 24 has no directionality.

As described above, the suspending force, which is applied by the leaf spring 24 so as to suspend the holder 20 in the holder base 22, and the lifting force, which is applied by the spring 30 so as to lift the holder 20 upward with respect to the holder base 22, work to the holder 20 as elastic forces. Namely, the holder 20 is floated and supported with respect to the holder base 22 by the elastic forces, which are applied via the leaf spring 24 and the supporting pin 28. The tester of the present embodiment is characterized in that a suspending function for elastically floating and supporting the holder 20 is the same as a function of the conventional magnetic head suspension assembly.

The suspension of the conventional magnetic head suspension assembly too allows the slider 10 to elastically incline in any direction. Therefore, by elastically floating and supporting the holder 20 to have the function of the conventional suspension, prescribed tests of the slider can be performed without mounting the slider to be tested onto a real suspension.

Figure 3:
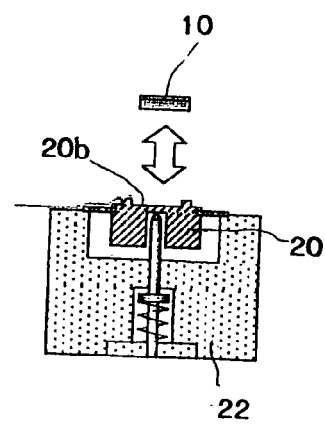
FIG. 3 is an explanation view showing a method for attaching the holder to a slider.

FIG. 3 shows a state of attaching the slider 10 to and detaching the same from the holder 20. A concave section 20b for setting the slider 10 is formed in an upper face of the holder 20. The slider 10 is inserted into the concave section 20b so as to set in the holder 20. Contact points, which electrically connect to the terminals 16 formed in the side face of the slider 10 when the slider 10 is set, are formed in an inner face of the concave section 20b. A test unit for testing electromagnetic transduction characteristics of the test sample and signal cables 32 are connected to the contact points. The test sample or the slider 10 may be attached to and detached from the concave section 20b of the holder 20 according to the test operations.

In FIG. 1, a symbol 40 stands for a medium, which is used for testing characteristics of floating the slider 10 and characteristics of writing and reading data. When characteristics of floating the slider 10 are tested, a transparent medium, e.g., a glass medium, is used as the medium 40; when characteristics of writing and reading data are tested, a real recording medium is used. A symbol 42 stands for a spindle. A symbol 44 stands for a laser unit for testing characteristics of floating the slider 10. A symbol 50 stands for a test unit for testing electromagnetic transduction characteristics of the slider 10. A symbol 52 stands for an amplifier. The test unit 50 and the slider 10 are electrically connected by the cables 32.

The holder 20 including the holder 20 and the holder base 22 is supported by a supporting arm 55 and provided below the medium 40. The slider 10 is supported by the holder 20 and provided at an upper end of the holder 20. With this structure, the slider 10 opposes to a bottom face of the medium 40. The supporting arm 55 is capable of turning in a horizontal plane about a shaft 56, and its vertical height can be adjusted.

To test the slider 10, firstly the height of the supporting arm 55 is adjusted until the slider 10, which has been set in the holder 20, contacts a surface of the medium 40 by elasticity of the leaf spring 24 and the spring 30. In this state, the medium 40 is rotated at prescribed rotational speed, and characteristics of floating the slider 10 and electromagnetic transduction characteristics of the slide 10 are measured. By properly turning the supporting arm 55, characteristics of floating the slider 10 and electromagnetic transduction characteristics thereof with respect to rotational positions (rotational angles) of the medium can be measured as well as the test executed by turning a magnetic head suspension assembly. To test characteristics of floating the slider 10, the laser unit 44 is used; to test electromagnetic transduction characteristics, the test unit 50 is used.

To exchange the test sample, the slider 10 tested is detached from the holder 20, then a new slider 10 to be tested is set therein. As described above, the sliders 10 can be tested one by one.

In the magnetic head tester of the present embodiment, the slider need not be previously mounted on a suspension, and the sliders can be tested one by one with exchanging and setting them. Unlike the conventional tests in which bad magnetic head suspensions including sliders and suspensions are wholly discarded, no magnetic head suspensions are wholly discarded and loss of manufacturing cost and assembling cost can be reduced.

In the magnetic head tester of the present embodiment, suspending function, e.g., elasticity, flexibility, of the mechanism for supporting the holder 20, in which the slider 10 is set, is equal to that of the magnetic head suspension assembly of a real apparatus, so sliders can be tested under real conditions as well as those assembled in the real apparatus. In the conventional tests, the slider is mounted on the suspension, so assembling errors influence results of the tests; the problem can be solved, and characteristics of the slider itself can be judged correctly.

As described above, in the magnetic head tester of the present embodiment, characteristics of magnetic heads can be tested without mounting the magnetic heads onto suspensions. Note that, there are other ways of giving the suspending function of the suspension of the magnetic head suspension assembly to the magnetic head tester. Other mechanisms for supporting the slider with suspending means will be explained.

Figure 4:
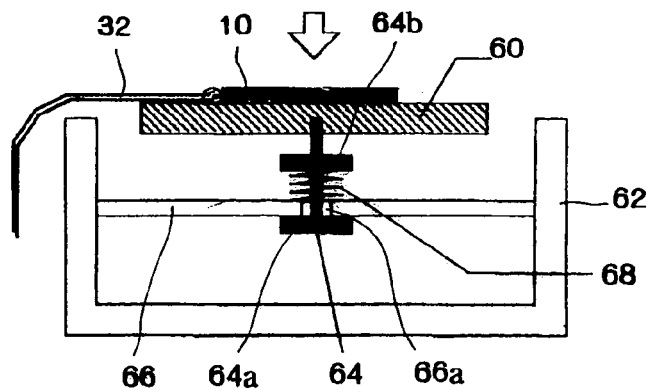
FIG. 4 is a sectional view of the holder inclinably holding the slider.

In a mechanism for supporting the slider 10 shown in FIG. 4, the test sample or the slider 10 is supported by a holder 60 like a flat plate, and the holder 60 is supported by a holder base 62 and capable of inclining in any direction. The holder 60 detachably and inclinably holds the slider 10 and has functions which are similar to those of the holder 20 of the former embodiment. To allow the inclination of the holder 60, a supporting pin 64 is corresponded to a load center of the holder 60 and fixed to a bottom face of the holder 60, and the supporting pin 64 is inclinably supported by a beam 66 fixed to the holder base 62. Symbols 64a and 64b stand for flanges of the supporting pin 64, which are located on the upper and the lower side of the beam 66. A symbol 68 stands for a spring, which is provided between the flange 64b and the beam 66 and which always biases the holder 60 upward. The supporting pin 64 is pierced through a through-hole 66a of the beam 66. By loosely inserting the supporting pin 64 through the through-hole 66a, whose inner diameter is greater than an outer diameter of the supporting pin 64, and elasticity of the spring 68, the supporting pin 64 or the holder 60 can be inclined, with respect to the beam 66, in any direction.

In the present embodiment, the holder 60 is supported by the supporting pin 64 only at a point. Therefore, the load working on the holder 60 concentrates to the point when the slider 10 is set in the holder 60 to execute the tests, a weight can be vertically applied to the surface of the medium without reference to postures of the slider 10. The slider 10 is floated by rotation of the medium, and actions of the slider 10 are influenced by the mass of the holder 60. To solve this disadvantage, the influence on actions of the slider 10 can be reduced by reducing the mass of the holder 60 (e.g., 50 mg or less). Of course, the elasticity of the spring 68 is designed to have suspending functions equal to those of the suspension on which the slider 10 is mounted.

In embodiments shown in FIGS. 5, 6, 7 and 8, elastic members are provided between the holder 60 and the beam 66 so as to restrict inclination and vibration of the holder 60. In the embodiment shown in FIG. 5, a coil spring 70, which has a large diameter, is provided between the holder 60 and the beam 66 and covers the supporting pin 64. In the embodiment shown in FIG. 6, a plurality of coil springs 71 are provided between the holder 60 and the beam 66 and central-symmetrically arranged. In the embodiment shown in FIG. 7, a leaf spring 72 is provided between a bottom face of the holder 60 and an edge of the holder base 62 so as to elastically support the holder 60. In the embodiment shown in FIG. 8, a cushion 73 is provided between the holder 60 and the beam 66 as the elastic member. In each embodiment, as well as the embodiment shown in FIG. 4, the supporting pin 64 is inclinably supported by the beam 66 with the spring 68, and the holder 60 is inclinably supported by the supporting pin 64.

Figure 5:
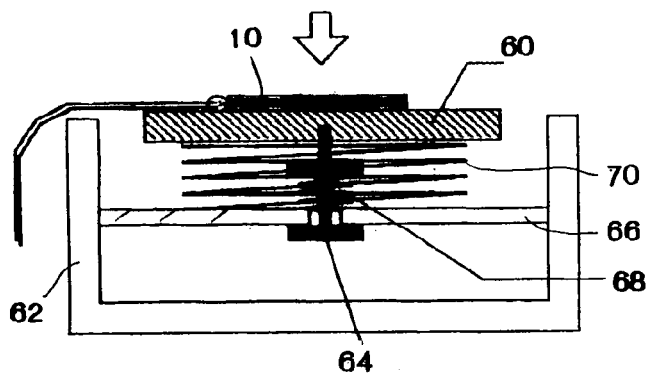
FIG. 5 is a sectional view of a base plate supported by a coil spring.
Figure 6:
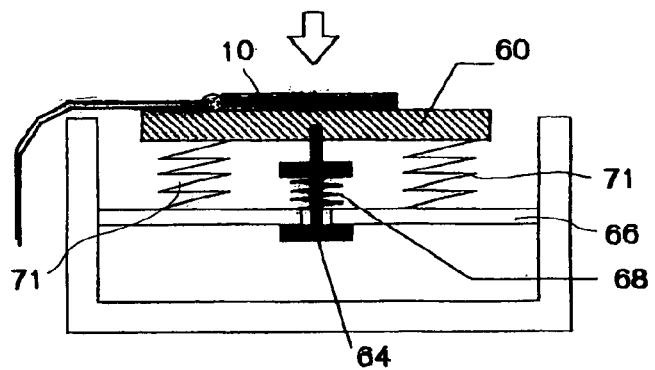
FIG. 6 is a sectional view of another base plate supported by coil springs.

In the embodiments shown in FIGS. 5 and 6, in which the coil springs 70 and 71 are employed as the elastic members, according to characteristics of the coil springs, if the inclination of the holder 60 is small, a force applied from the holder 60 to the coil springs 70 and 71 is small; if the inclination of the holder 60 is great, the force applied from the holder 60 to the coil springs 70 and 71 is great. This means that the holder 60 or the slider 10 can be freely inclined as far as the holder 60 is inclined within a prescribed inclination range; the holder 60 is elastically returned to an initial position by the coil springs 70 and 71 if the inclination of the holder 60 deviates from the prescribed inclination range, so that its posture can be controlled.

When the medium is rotated to execute the tests, if the holder 60 is inclined (initial inclination), the slider 10 is inclined and contacts the surface of the medium. The coil springs 70 and 71 restrict the initial inclination of the holder 60 or the slider 10 so as to accurately measure.

Figure 7:
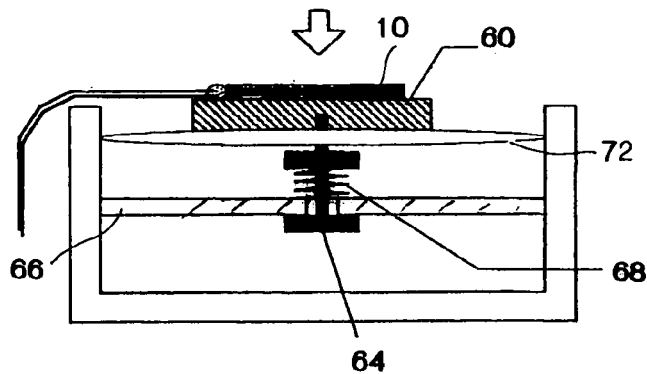
FIG. 7 is a sectional view of the base plate supported by a leaf spring.
Figure 8:
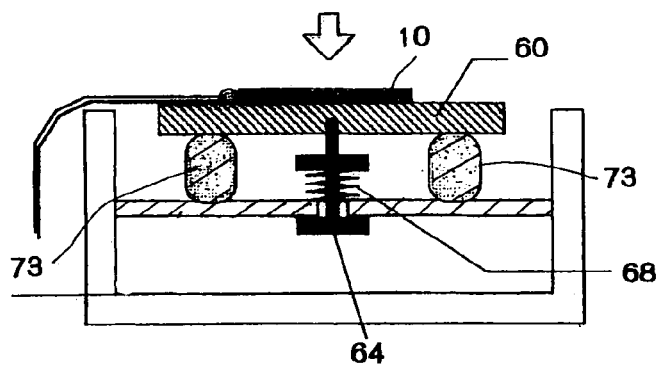
FIG. 8 is a sectional view of the base plate supported by a cushion.

As shown in FIG. 7, in the case of supporting the holder 60 by the leaf spring 72 too, inclination and vibration of the holder 60 or the slider 10 can be restricted as well as the case of employing the coil springs 70 and 71. Note that, in the case of supporting the holder 60 in the holder base 62 by the leaf spring 72, ability of supporting the holder 60 without inclination can be further improved. In the case of employing the cushion 73 as shown in FIG. 8, the inclination and the vibration of the holder 60 or the slider 10 can be restricted. Further, the cushion 73 acts as damper for absorbing vibration.

Figure 9:
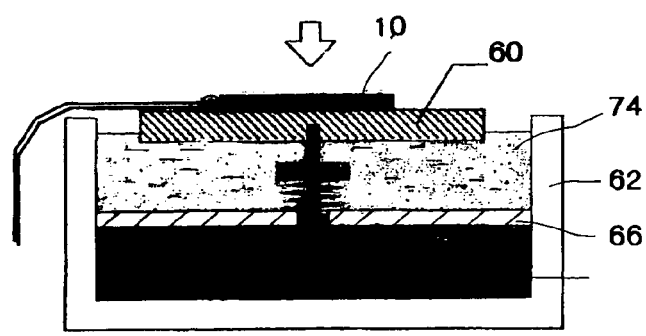
FIG. 9 is a sectional view of the base plate supported by a liquid.

FIG. 9 shows another embodiment, in which a liquid 74 is employed to restrict the inclination and the vibration of the holder 60. The supporting pin 64 is supported by the beam 66, which is spanned in the holder base 62, with the spring 68, and the holder 60 is inclinably supported as well as the embodiment shown in FIG. 4. In the present embodiment, the holder base 62 is a water-tight container, whose upper end is opened, and the liquid 74 is stored until contacting the holder 60. Specific gravity of the liquid 74 is greater than that of the holder 60 so as to float the holder 60 in the liquid 74. Therefore, the holder 60 can freely incline, but an excessive inclination of the holder 60 can be prevented. Further, the liquid 74 acts as a damper for preventing vibration of the holder 60.

Figure 10:
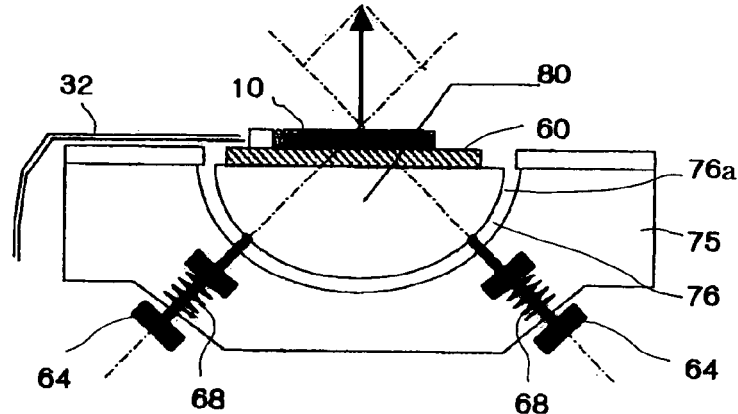
FIG. 10 is a sectional view of a hemispheric base supporting the slider.
Figure 11:
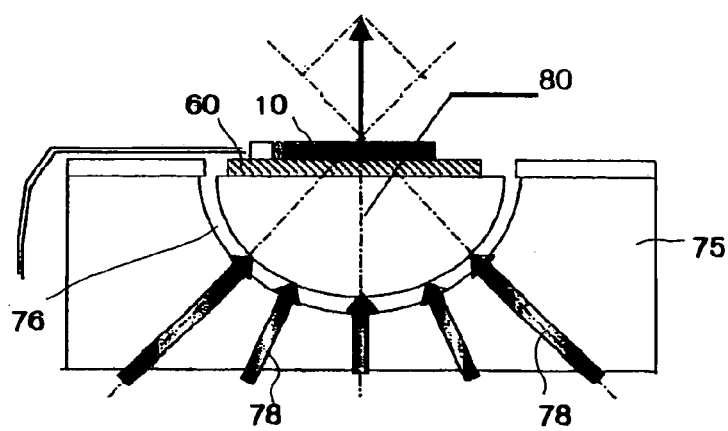
FIG. 11 is a sectional view of another hemispheric base supporting the slider.
Figure 12:
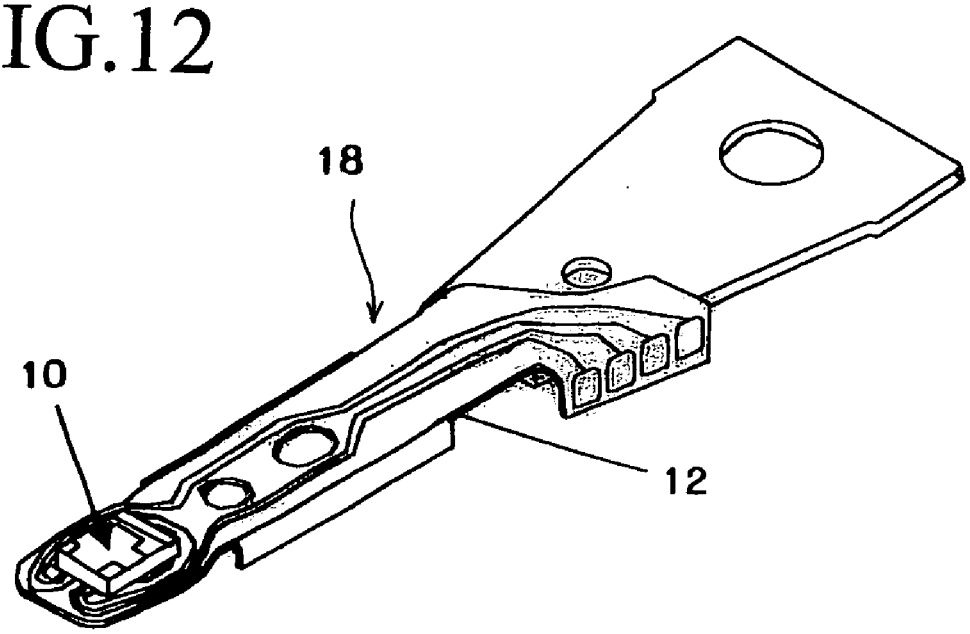
FIG. 12 is a perspective view of the magnetic head suspension assembly.
Figure 13:
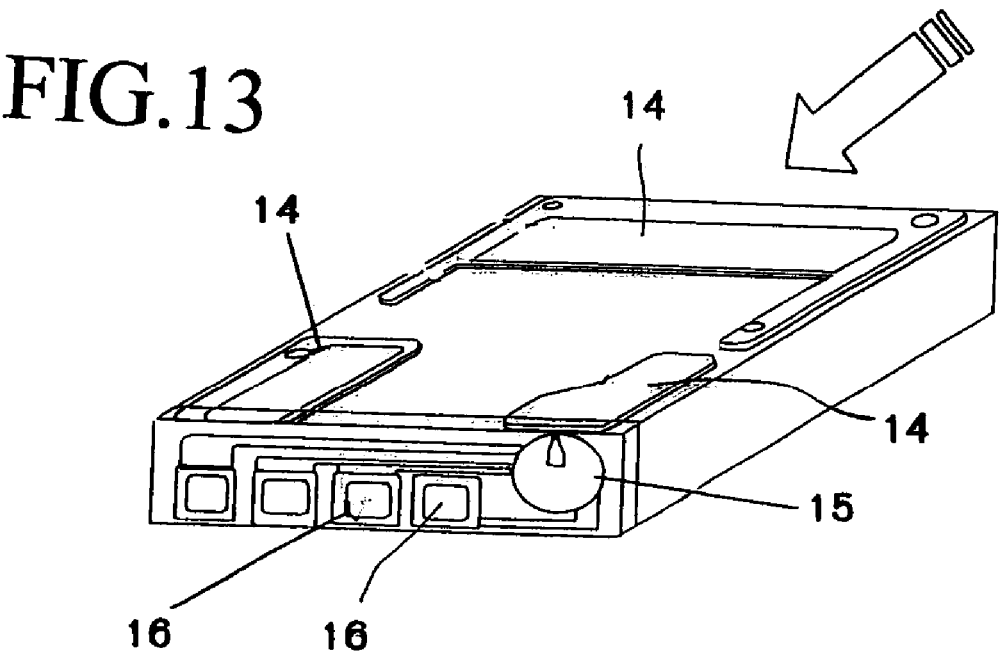
FIG. 13 is a perspective view of the slider.

Other mechanisms for supporting the slider 10 are shown in FIGS. 10 and 11. In FIG. 10, a hemispheric base 80 supporting the slider 10 is inclinably supported by a holder base 75. The hemispheric base 80 is attached to the holder base 75, and its flat face faces upward. The holder 60 is fixed on the flat face of the hemispheric base 80, and the slider 10 is detachably attached to the holder 60. Note that, the slider 10 may be detachably attached to the flat face of the hemispheric base 80 without using the holder 60.

A concave section 76 having an inner spherical face 76a, which opposes to a spherical face of the hemispheric base 80, is formed in the holder base 75. Supporting pins 64 are attached to the holder base 75 and headed toward a center of the hemispheric base 80, and they are biased, by springs 68, to project their front ends from the inner spherical face 76a. The supporting pins 64 are central-symmetrically arranged with respect to a center of the concave section 76, so that a resultant force of elastic forces caused by elasticity of the springs 68 of the supporting pins 64 is vertically applied to the surface of the medium. Front ends of the supporting pins 64 are rounded and capable of sliding on the spherical face of the hemispheric base 80. With this structure, the slider 10 supported by the holder 60 can be inclined in any direction, so that suspending functions equal to those of the real suspension, on which the slider is mounted, can be gained.

In FIG. 11, air holes 78 are formed in the holder base 75 instead of the supporting pins 64 of the embodiment shown in FIG. 10, and air is jetted outward from the air holes 78 so as to inclinably support the hemispheric base 80 in the concave section 76. In the present embodiment, axial lines of the air holes 78 are headed toward the center of the hemispheric base 80, and the air holes 78 are central-symmetrically arranged. With this structure, the hemispheric base 80 can be inclined in any direction, and a resultant force of jetted air is vertically applied to the surface of the medium. By adjusting the pressure of the air jetted out from the air holes 78, a suspending force supporting the slider 10 can be adjusted, and the tests can be executed with adjusting the air pressure according to conditions of products.

EFFECTS OF THE INVENTION

In the magnetic head tester of the present invention, as described above, no slider has been previously mounted on a suspension when characteristics of the magnetic head are tested. Therefore, even if the magnetic head is judged to be a bad product, no suspension is discarded, so that loss of a manufacturing cost of the suspension and an assembling cost of mounting the slider onto the suspension can be reduced. Further, measured results influenced by assembling variations of mounting the sliders onto the suspensions can be removed, so that characteristics of the magnetic head can be judged correctly.

What is claimed is:

1. A magnetic head tester for testing characteristics of a magnetic head, in which a medium is rotated to float a slider from the medium, comprising:
   a holder removably holding the slider opposed to a surface of the medium;
   a holder base that at least partially surrounds said holder; and
   a supporting pin positioned between said holder and said holder base for inclinably supporting said holder.

2. The magnetic head tester according to claim 1, further comprising a biasing member for biasing said supporting pin against said holder.

3. The magnetic head tester according to claim 1, wherein said holder base includes an accommodating hole for receiving said holder therein.

4. The magnetic head tester according to claim 1, wherein said holder includes a loose hole for receiving said supporting pin therein.

5. The magnetic head tester according to claim 1, further comprising:
   a biasing member for biasing said supporting pin against said holder;
   an accommodating hole, in said holder base, for receiving said holder therein; and
   a loose hole, in said holder, for receiving said supporting pin therein.

6. The magnetic head tester according to claim 5, wherein said biasing member is a coil spring that is coaxially positioned around said supporting pin.

7. A magnetic head tester for testing characteristics of a magnetic head, in which a medium is rotated to float a slider from the medium, comprising:
   a holder removably holding the slider opposed to a surface of the medium;
   suspension means being provided on said holder, which has the same function as a suspension supporting the slider in a real apparatus;
   a holder base inclinably holding said holder, with respect to the surface of the means for always biasing said holder toward the medium; and
   an elastic member being provided between said holder and said holder base so as to limit inclination of said holder;
   wherein said holder is inclinably supported, with respect to said holder base, by a supporting pin, which supports and contacts a load center of said holder, and said biasing means is provided to bias said supporting pin;
   wherein said elastic member is a leaf spring of said holder, which suspends said holder.

8. A magnetic head tester for testing characteristics of a magnetic head, in which a medium is rotated to float a slider from the medium, comprising:
   a holder removably holding the slider opposed to a surface of the medium;
   suspension means being provided on said holder, which has the same function as a suspension supporting the slider in a real apparatus;
   a holder base inclinably holding said holder, with respect to the surface of the medium; and
   means for always biasing said holder toward the medium;
   wherein said holder is inclinably supported, with respect to said holder base, by a supporting pin, which supports and contacts a load center of said holder, and said biasing means is provided to bias said supporting pin; and further wherein a liquid is stored in said holder base, and said holder is floated on and supported by the liquid.

9. A magnetic head tester for testing characteristics of a magnetic head, in which a medium is rotated to float a slider from the medium, comprising:
- a holder removably holding the slider opposed to a surface of the medium; and
- suspension means being provided on said holder, which has the same function as a suspension supporting the slider in a real apparatus;
- a holder base inclinably holding said holder, with respect to the surface of the medium;
- means for always biasing said holder toward the medium;
- a hemispheric base supporting the slider on a flat face; and
- a plurality of supporting pins being central-symmetrically arranged in said holder base, said supporting pins being biased toward said hemispheric base so as to slidably support a spherical face of said hemispheric base, wherein axial lines of said supporting pins are radially arranged with respect to a center of said hemispheric base.

10. A magnetic head tester for testing characteristics of a magnetic head, in which a medium is rotated to float a slider from the medium, comprising:
- a holder removably holding the slider opposed to a surface of the medium; and
- suspension means being provided on said holder, which has the same function as a suspension supporting the slider in a real apparatus;
- a holder base inclinably holding said holder, with respect to the surface of the medium;
- means for always biasing said holder toward the medium;
- a hemispheric base supporting the slider on a flat face, said hemispheric base being slidably supported by said holder base; and
- a plurality of air holes being central-symmetrically formed in said holder base and radially arranged with respect to a center of said hemispheric base, wherein air is jetted toward a spherical face of said hemispheric base form said air holes.

11. A magnetic head tester for testing characteristics of a magnetic head, in which a medium is rotated to float a slider from the medium, comprising:
- a holder removably holding the slider opposed to a surface of the medium;
- suspension means being provided on said holder, which has the same function as a suspension supporting the slider in a real apparatus;
- a holder base inclinably holding said holder, with respect to the surface of the medium;
- means for always biasing said holder toward the medium; and
- an elastic member being provided between said holder and said holder base so as to limit inclination of said holder;
- wherein said holder is inclinably supported, with respect to said holder base, by a supporting pin, which supports and contacts a load center of said holder, and said biasing means is provided to bias said supporting pin; and
- wherein said elastic member is a coil spring.

* * * * *

UNITED STATES PATENT AND TRADEMARK OFFICE
CERTIFICATE OF CORRECTION

PATENT NO. : 7,196,512 B2
APPLICATION NO. : 10/722823
DATED : March 27, 2007
INVENTOR(S) : Kainuma et al.

It is certified that error appears in the above-identified patent and that said Letters Patent is hereby corrected as shown below:

Claim 7, Col. 8, Line 41    After "the surface of the" insert --medium;--
and thereafter insert a new paragraph.

Signed and Sealed this

Seventeenth Day of August, 2010

David J. Kappos
*Director of the United States Patent and Trademark Office*